(No Model.)
W. W. DODGE.
WATCH CHARM.
No. 258,723.        Patented May 30, 1882.
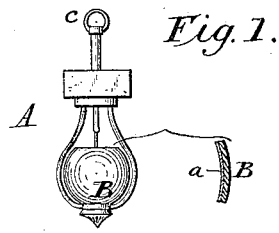
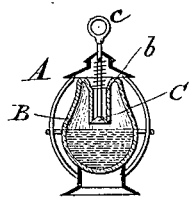
Attest.
Sidney P. Hollingsworth
Walter S. Dodge.
Inventor.
William W. Dodge

UNITED STATES PATENT OFFICE.

WILLIAM W. DODGE, OF WASHINGTON, DISTRICT OF COLUMBIA.

WATCH-CHARM.

SPECIFICATION forming part of Letters Patent No. 258,723, dated May 30, 1882.

Application filed April 14, 1882. (No model.)

*To all whom it may concern:*

Be it known that I, WILLIAM W. DODGE, of Washington, in the District of Columbia, have invented certain Improvements in Watch-Charms, of which the following is a specification.

My invention consists in a watch-charm containing or coated with phosphorescent or luminous compound or substance, whereby it is caused to give light in the darkness after having been previously exposed to the light.

It is well known that phosphorus dissolved in oil or fatty matters, and exposed to the light, will subsequently emit light, if permitted to receive oxygen from the air; and it is also a matter of common knowledge that various mixtures and compositions containing phosphorus or phosphorescent matters will give out light in the darkness for a number of hours after exposure to the light. The preparations are now made in the form of a paint or liquid, which can be applied to surfaces of all sorts, and which have been applied to match-safes, clock-dials, &c., and being thus well known, need not be particularly described, though I prefer a calcium sulphide, as such preparation, after short exposure to sunlight, continues to give out light for about ten hours. "Canton's phosphorus," so called, will answer well, and may be prepared as follows: Calcine clean oyster-shells to whiteness in a crucible, separate the clearer portions, reduce these to a fine powder, and place in layers with intermediate layers of flowers of sulphur in a crucible. Cover and heat to dull redness for about a half an hour. Cover the crucible tightly, and let it cool slowly in the crucible. This preparation or other like mixture I apply to the charm in any convenient manner. I prefer, however, to make the charm in imitation of a lantern, an electric light, a torch, or other form of light-giving device, and to construct the same in whole or in part of glass or other transparent or translucent material, in hollow form, and to coat or charge the interior of the glass body with the preparation.

In the accompanying drawings, Figure 1 represents my improved charm made in imitation of an electric light; and Fig. 2, the same made to represent a lantern, the latter being adapted to use the phosphorus dissolved in oil, as explained, and being furnished with a valve for admitting air.

A represents the charm as a whole, provided with a glass globe, B, which in Fig. 1 is shown as coated on the inside with phosphorescent paint or compound *a*.

In Fig. 2 the globe B is shown as closed at the bottom, and having its upper edge, *b*, curled downward on the inside to prevent the phosphorescent material on the inside from being thrown out at the top, while at the same time the air may enter. In the use of such preparation of the material it is necessary that the globe be kept normally closed against the entrance of air, as otherwise it would soon cease to give out light; and therefore I provide a valve, C, which may be depressed to permit the entrance of air, but which at other times excludes the air and also prevents any possible escape of the liquid.

The form of the charm is immaterial.

It will be seen, that being carried on the watch-chain, this charm will be in convenient proximity to the watch to show the figures and hands in the dark without the annoyance attending the application of the preparation to the watch-dial, as has been proposed. Being in sight, too, the charm will attract attention and make a pleasing ornament for the watch-chain both by day and by night.

A ring, C, is provided for convenience of attachment to a chain or guard.

I am aware that vessels of various kinds have been formed with inwardly-turned lips or edges to prevent the contents from being thrown out, and this I do not broadly claim; but a charm having a globe so made is new, so far as I am aware.

Having thus described my invention, what I claim, is—

1. A charm for watch-chains, &c., charged with luminous matter, substantially such as described, and adapted to be attached to a chain.

2. As a new article of manufacture, a watch-charm containing a transparent body provided on its inside with luminous matter, as explained.

3. The herein-described charm, having the globe B, charged with luminous matter, substantially such as described, and provided with valve C, as and for the purpose explained.

4. In a charm such as described, the globe B, having the inwardly-turned edge *b*, as and for the purpose set forth.

WILLIAM W. DODGE.

Witnesses:
FRANCIS M. MCMILLAN,
WALTER S. DODGE.